United States Patent
Yebka et al.

(10) Patent No.: US 8,263,242 B2
(45) Date of Patent: Sep. 11, 2012

(54) VENTING MECHANISMS FOR BATTERY CELLS

(75) Inventors: Bouziane Yebka, Cary, NC (US);
Jeremy R. Carlson, Cary, NC (US);
Larry G. Estes, Durham, NC (US);
Joseph A. Holung, Wake Forest, NC (US); Timothy Humphrey, Raleigh, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1023 days.

(21) Appl. No.: 12/202,314

(22) Filed: Aug. 31, 2008

(65) Prior Publication Data
US 2010/0055545 A1    Mar. 4, 2010

(51) Int. Cl.
*H01M 2/02*    (2006.01)
*H01M 2/12*    (2006.01)
*H01M 2/08*    (2006.01)

(52) U.S. Cl. ............. 429/56; 429/53; 429/82; 429/175; 429/178

(58) Field of Classification Search .......... 429/56, 429/53, 82, 175, 178
See application file for complete search history.

(56) References Cited

U.S. PATENT DOCUMENTS
6,524,739 B1 *    2/2003    Iwaizono et al. ............. 429/61
* cited by examiner

*Primary Examiner* — Helen O Conley
(74) *Attorney, Agent, or Firm* — Ference & Associates LLC

(57) ABSTRACT

The provision of improved venting in battery cells by way of better preventing pressure buildup in the cells. Via different variants of the present invention, the following advantages are achieved:
Gas can escape from the cell without clogging the vent;
gas buildup is avoided while the venting valve can operate in a consistently reliable manner;
the solutions presented are sufficiently versatile as to be applicable to a variety of cells on the market; and
the risk of explosion is virtually eliminated.

38 Claims, 7 Drawing Sheets

NORMAL BEHAVIOR DURING VENTING 210 (BURSTING DISC)

ABNORMAL BEHAVIOR DURING VENTING

WASHER COLLAPSES AND CLOGS THE VENT ORIFICES 206 (ORIFICES - VENT)
204 (POSITIVE TERMINAL)
210 (BURSTING DISC)
208 (WASHER)

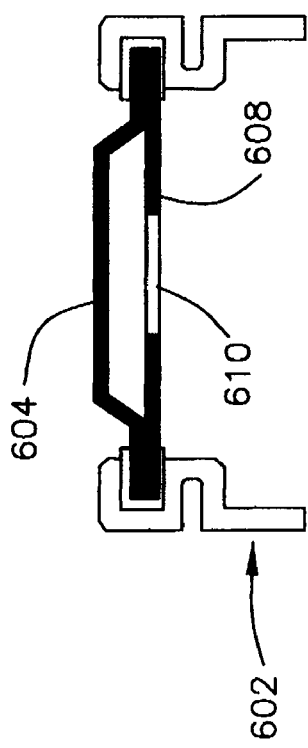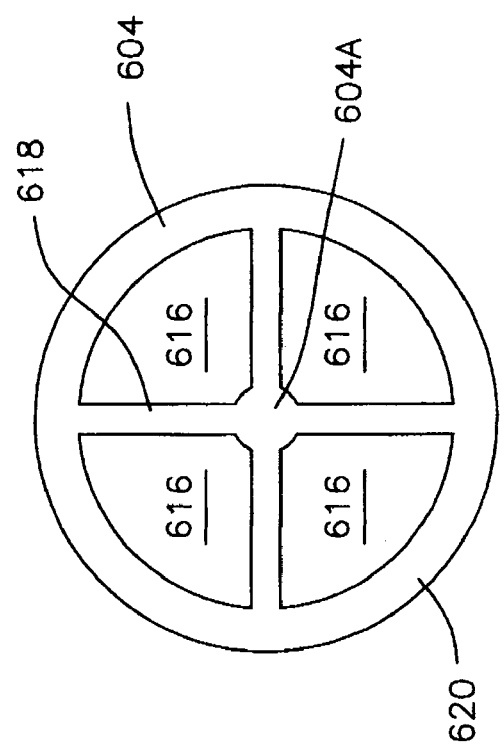

VENTING MECHANISMS FOR BATTERY CELLS

FIELD OF THE INVENTION

The present invention relates generally to computer systems and to methods and arrangements for establishing customer/user defaults in computer systems.

BACKGROUND OF THE INVENTION

Rechargeable Lithium-Ion batteries are used extensively in notebook computers, cell phones and many other types of portable equipment primarily because of their relatively low cost and high energy storage capability. However, increasing demands to package more power into a given cell size are creating a strain on practical and technological limits for some geometries. This is evidenced by a marked increase in safety-related incidents where cells have has exploded, ruptured, or vented (i.e., undergone a forced expulsion of gases). The safety hazards from such incidents, although rare, include the potential for causing a fire and the risk of burns and other injury from projectiles and ejected cell contents. This problem has in fact subjected some battery vendors and equipment manufacturers to a number of well-publicized recalls.

Generally, a safety relief valve (or vent) represents one of the most important safety mechanisms on any cell. All cylindrical cells are required by law to be fitted with pressure relief devices designed to relieve excess gas pressure. The function of a safety relief valve (vent) is to keep a cell from rupturing in the unlikely event of excessive pressure buildup.

Generally, all current production of Li-Ion batteries involves the provision of venting mechanism at the top of the cell, which provides a safe manner of releasing excess internal pressure and preventing the cell from reaching excessively high pressure and rupture. This venting mechanism needs to be capable of operating at all times, especially during internal pressure buildup. Once a condition occurs that causes the pressure in a cell to rise to a dangerous level, the vent may be the only device at hand to prevent a catastrophic failure.

Historically, it has been shown that in order for a venting mechanism to work properly, not only should the vent be able to release the buildup gas pressure as fast as possible, but nothing should block the discharge channel, that is, the passage or passages through which gas must pass to reach the operating parts of the safety relief device.

Extensive pinpoint heating tests have shown that some cells are prone to rupture even before thermal runaway (i.e., a rapid increase in temperature), whence a supporting washer collapses and clogs the main venting orifice on the terminal disc (see description of FIG. 2 further below). While under normal conditions the valve "bursting disc" opens and the gas flows through the opening and exits the cell through terminal orifices, under abnormal conditions the gasket expands and collapses against the terminal and clogs the vent orifices, thereby leading to cell rupture.

In view of the foregoing, a growing and compelling need has been recognized in connection with improving upon the discussed shortcomings and disadvantages, among others.

SUMMARY OF THE INVENTION

Broadly contemplated herein, in accordance with at least one presently preferred embodiment of the present invention, is the provision of improved venting in battery cells by way of better preventing pressure buildup in the cells.

In summary, one aspect of the invention provides an apparatus comprising: a battery-operable device; and a battery cell which provides power to the battery-operable device; the battery cell comprising: a terminal; and a venting arrangement which acts to vent gas responsive to pressure buildup within the battery cell; the venting arrangement comprising a yieldable element which yields under pressure and a support which supports the yieldable element; the venting arrangement further comprising windowing disposed in the terminal, the windowing acting to vent gas to ambient; the venting arrangement further comprising a supplementary measure which forestalls collapse of the support and the yieldable element towards the terminal responsive to pressure buildup within the battery cell.

Furthermore, an additional aspect of the invention provides a battery cell comprising: a terminal; and a venting arrangement which acts to vent gas responsive to pressure buildup within the battery cell; the venting arrangement comprising a yieldable element which yields under pressure and a support which supports the yieldable element; the venting arrangement further comprising windowing disposed in the terminal, the windowing acting to vent gas to ambient; the venting arrangement further comprising a supplementary measure which forestalls collapse of the support and the yieldable element towards the terminal responsive to pressure buildup within the battery cell.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 6 provides (a) a cross-sectional elevational view of a battery cell with a large opening at the terminal and (b) a plan view in isolation of the terminal itself.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
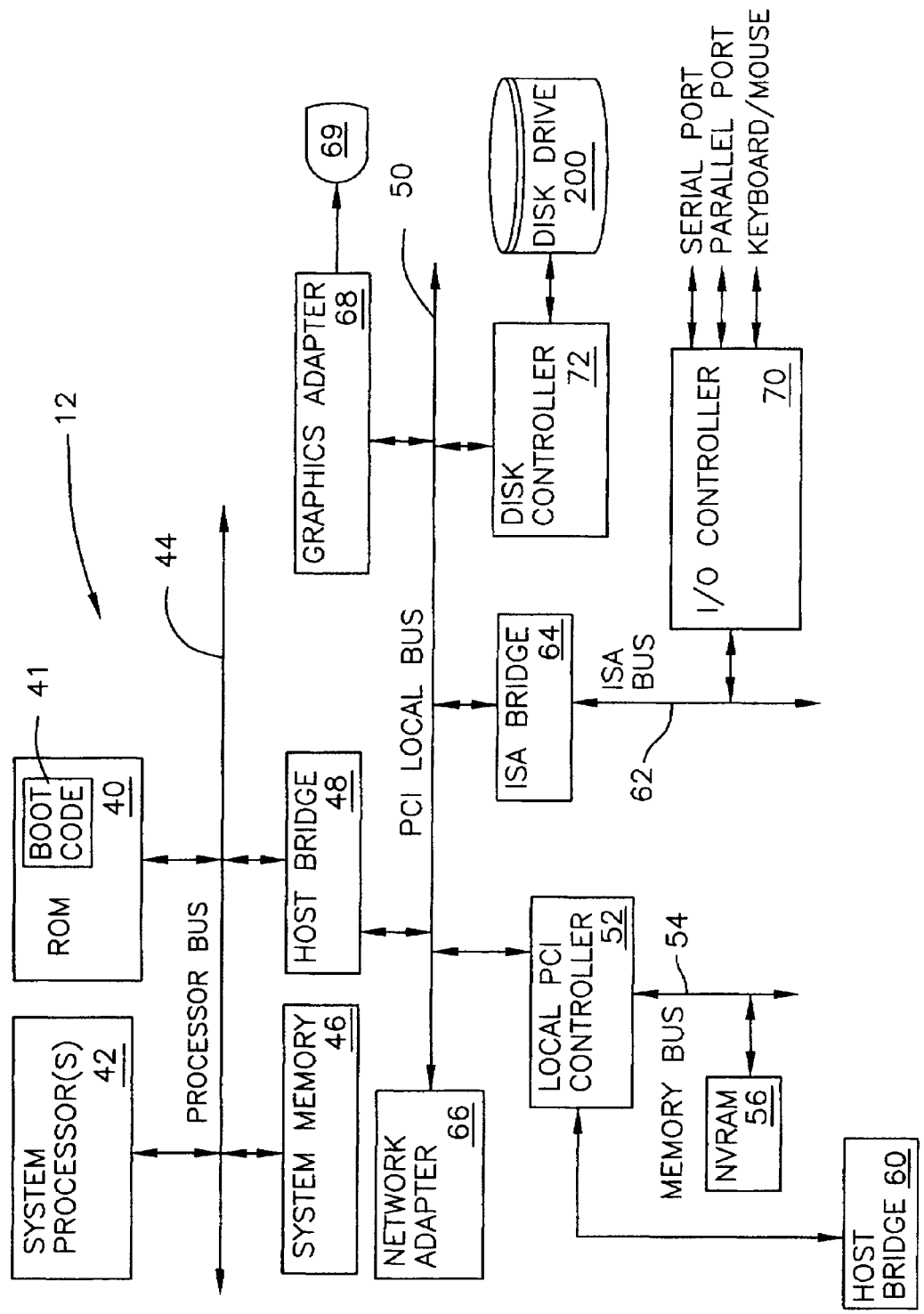
FIG. 1 schematically illustrates a computer system.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another. It should be understood that the system 12 of FIG. 1 provides but one illustrative and non-restrictive example among a very wide variety of systems that can be employed in accordance with embodiments of the present invention.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Figure 2B:
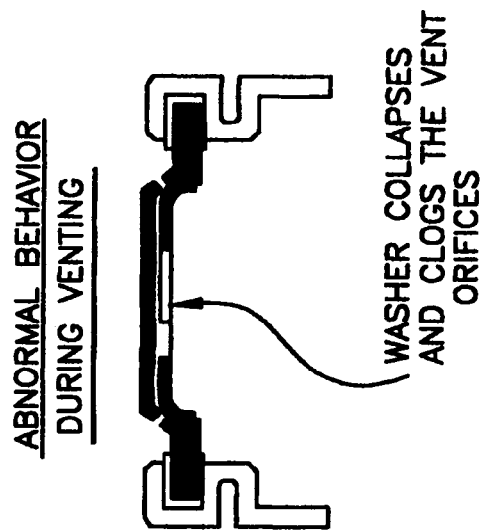
FIG. 2 provides cross-sectional elevational views of a conventional battery cell in different stages of action.
Figure 2C:
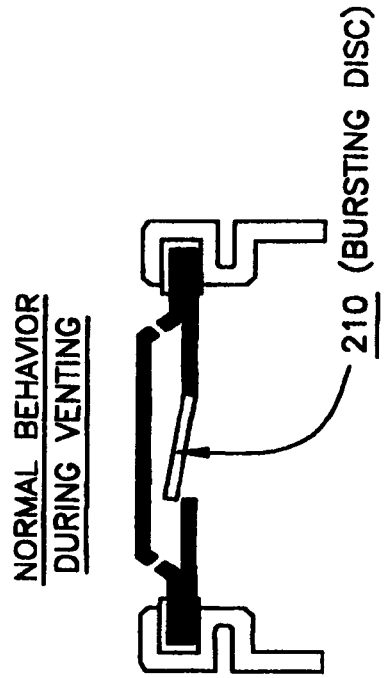
Figure 2A:
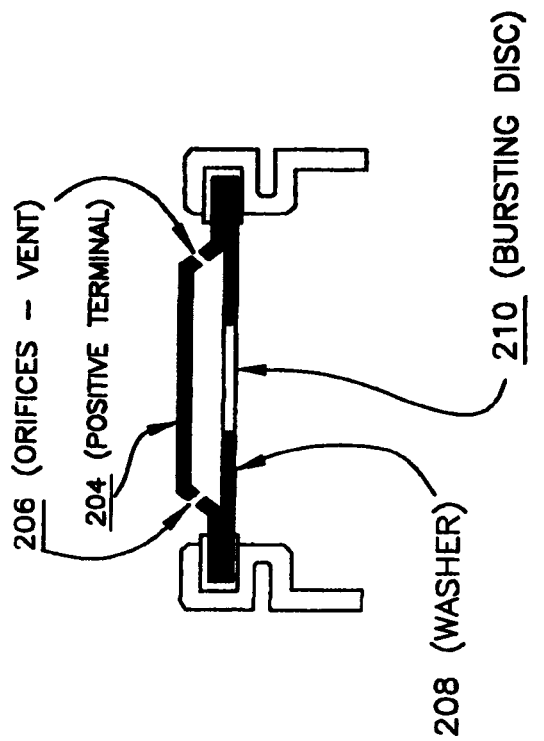

Generally, system 12 or essentially any suitable computer system or cell phone or other mobile device may, as is well-known, employ a battery pack that includes battery cells. Conventional cells have shown in testing that cell rupture can often be caused by a venting mechanism malfunction wherein the gasket expands and clogs the main orifices at the terminal; reference may be made again to FIG. 2. As shown in FIG. 2(a), a conventional cell 202 may include at a positive terminal 204 thereof a number of orifices 206 which circumscribe the terminal 204 (i.e., are distributed more or less evenly about a circumferential portion of terminal 204) while spaced apart from terminal 204 towards an interior of cell 202 is a washer (or annular portion) 208 with a bursting disc 210 nested therewithin. As shown in FIG. 2(b), normal behavior of cell 202 will desirably entail bursting disc 210 yielding or "popping up" with respect to washer 208 upon a buildup of heat or gas (and thus pressure) within cell 202 sufficient to overcome the attachment of bursting disc 210 with respect to washer 208; such heat and gas may thence safely vent through orifices 206. However, as shown in FIG. 2(c), such a conventional cell 202 has often been inadequate in mitigating the effects of such events, in that the venting provided by orifices 206 may not be sufficient to prevent washer 208 from collapsing towards terminal 204; this occurs particularly when a pressure buildup within cell 202 exceeds a specified design pressure of the cell. Worse yet, the collapsing of washer 208 towards terminal 204 has the effect of clogging up orifices 206.

Normally, the bursting disc 210 will essentially be formed from the same material, or material piece, as washer 208, wherein the bursting disc 210 is essentially delineated from the washer 208 by a circular groove that is recessed into the material of this single piece but does not fully penetrate the material.

The disclosure now turns to solutions, in accordance with at least one presently preferred embodiment of the present invention, that are configured to more readily accommodate greater buildups of heat or gas within a cell and thus to vent heat and gas more effectively and efficiently. Particularly, such solutions permit a cell to accommodate a pressure buildup within a cell that far exceeds a nominal design pressure of the cell, thus providing a vastly greater margin of safety than may be the case with conventional cells. Solutions are illustrated in FIGS. 3-7, and are provided for illustrative purposes; it should of course be understood that a very wide variety of analogous solutions may be realized in accordance with the present invention without departing from basic principles brought forth by the solutions shown in FIGS. 3-7. Among FIGS. 3-7, reference numerals indicating components similar or analogous to those shown in FIG. 2 are increased by multiples of 100.

Figure 3B:
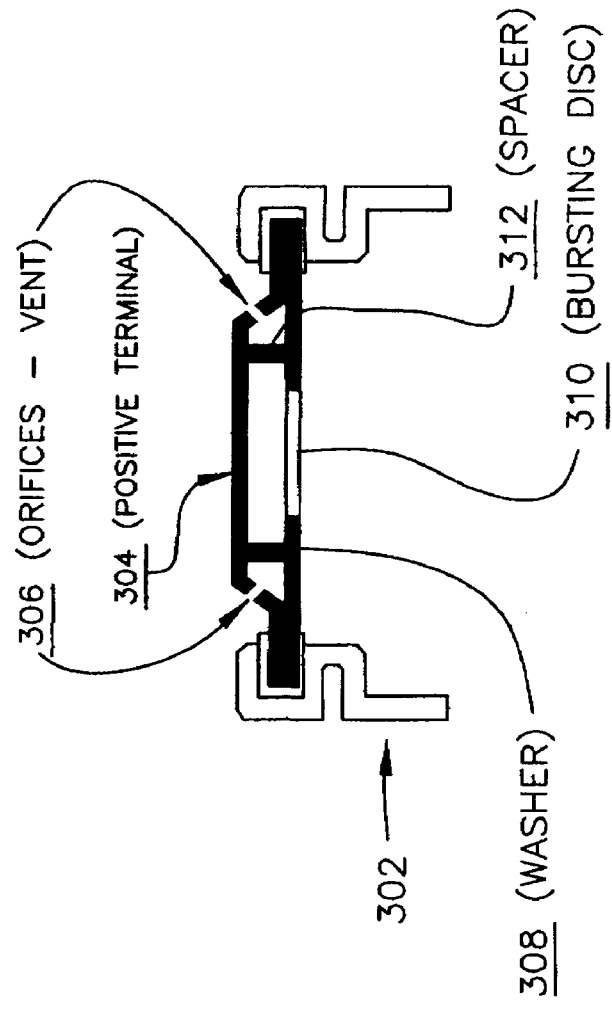
FIG. 3 provides (a) a perspective view of a spacer and (b) a cross-sectional elevational view of a battery cell employing such a spacer.
Figure 3A:
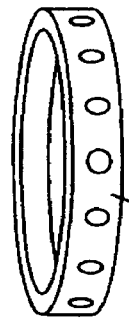

FIG. 3 provides (a) a perspective view of a spacer and (b) a cross-sectional elevational view of a battery cell employing such a spacer. As shown, spacer 312 may preferably be embodied by a ring with several orifices or holes distributed about a circumferential region thereof. This spacer ring 312 can be positioned, as shown, between washer 308 and positive terminal 304 to thereby provide a fixed gap or clearance for the bursting disc 310 to operate (popup) properly (e.g., akin to FIG. 2[b]) while also serving as a "stent" or impediment which prevents washer 308 from collapsing towards positive terminal 304, and thus prevents the above-discussed clogging of orifices 306 (e.g., akin to FIG. 2[c]).

Figure 4:
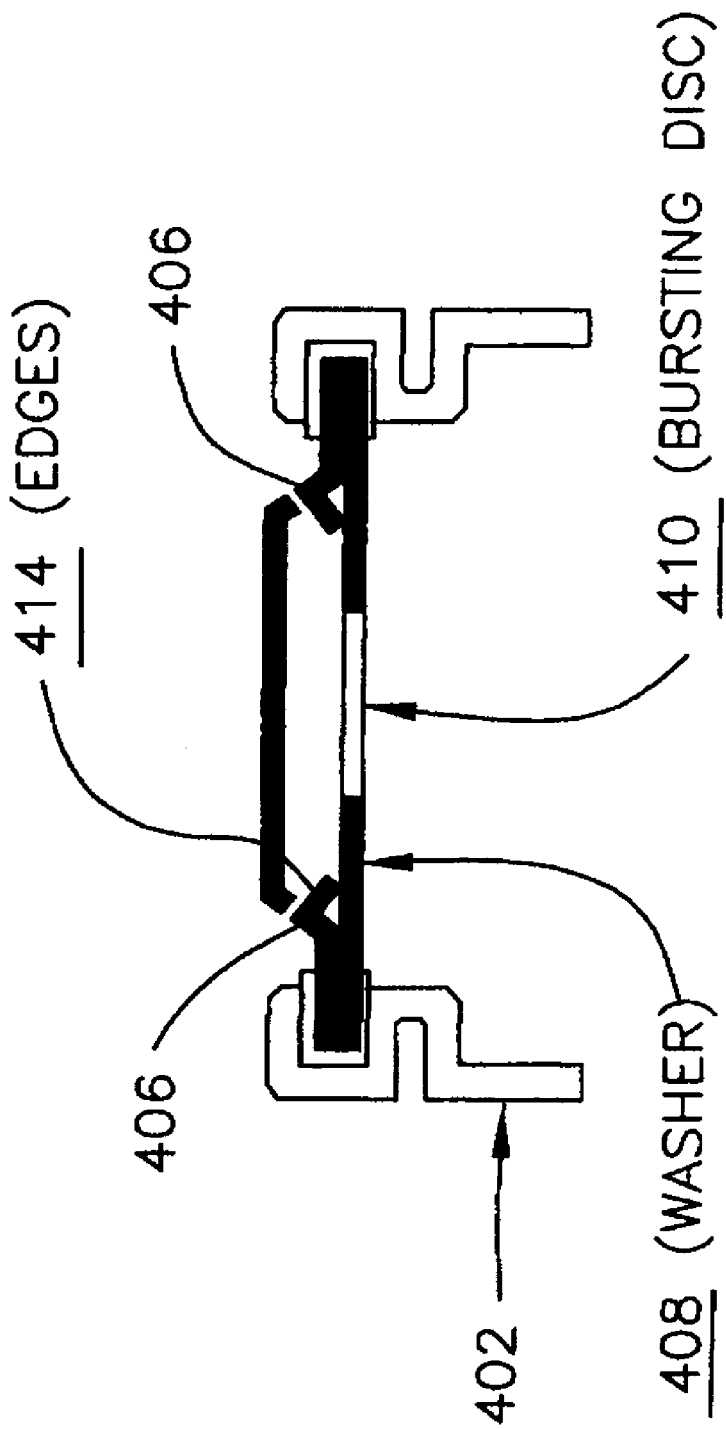
FIG. 4 provides a cross-sectional elevational view of a battery cell which includes edges for preventing clogging at a terminal.
Figure 5B:
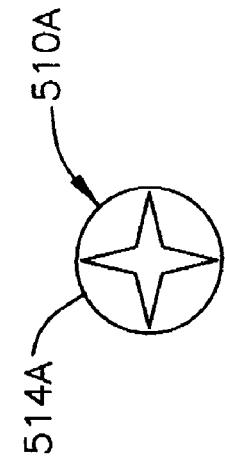
FIG. 5 provides cross-sectional elevational views (a,c) of battery cells each employing a bursting disc with enhanced score lines and plan views in isolation (b,d) of the bursting discs themselves.
Figure 5D:
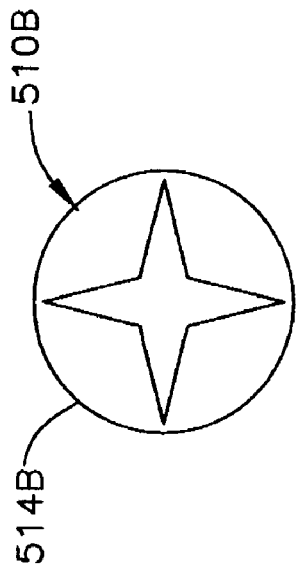
Figure 5A:
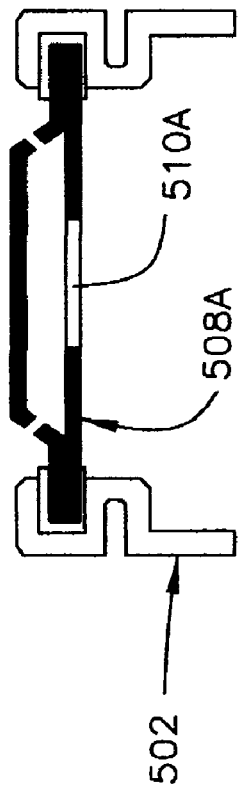
Figure 5C:
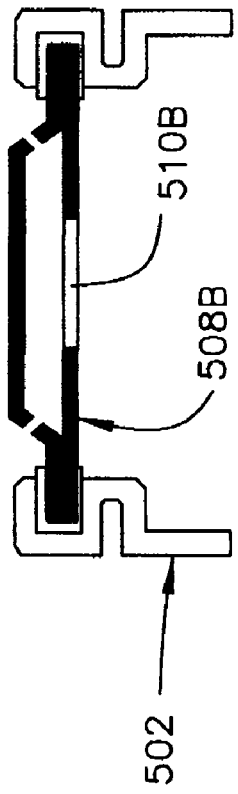

FIG. 4 provides a cross-sectional elevational view of a battery cell which includes edges or a lip 414 for preventing clogging at a terminal. This could thus be embodied by intermittent flanges disposed axially below (i.e., below in a direction parallel to a longitudinal axis of cell 402) the orifices 406, and thusly be distributed about an imaginary circle centered on the longitudinal axis of cell 402, or could be a continuous lip distributed about the same imaginary circle. Essentially, the effect of edges/flanges/lip 414 would be analogous to that of spacer 312 from FIG. 3; washer 408 would be prevented or inhibited from collapsing upwardly while bursting disc 410 would be provided with a reliable space or clearance within which to operate.

FIG. 5 provides cross-sectional elevational views (a,c) of battery cells each employing a bursting disc with enhanced score lines and plan views in isolation (b,d) of the bursting discs themselves. Thus, FIG. 5(b) shows in isolation a bursting disc 510a to be used in conjunction with cell 502a in FIG. 5(a), while FIG. 5(d) shows in isolation a bursting disc 510b to be used in conjunction with cell 502b in FIG. 5(c). Essentially, the chief difference between the variant of FIGS. 5(a)/(b) and that of FIGS. 5(c)/(d) is that, as shown, disc 510a is of smaller diameter than disc 510b. (The different bursting disc diameters help illustrate that since, in accordance with embodiments of the present invention any bursting disc or washer will be much less likely to collapse than in the case of conventional arrangements, a greater variety of diameters for the bursting disc [e.g., 510a/b] are now conceivable than might otherwise be the case. In other words, inasmuch as [for instance] a large-diameter bursting disc might be more likely to lead to the clogging of venting orifices upon failure of a washer and/or bursting disc, this alone might warrant the use, in conventional arrangements, of a smaller-diameter bursting disc. In contrast, in accordance with embodiments of the present invention, it will be appreciated that the greatly reduced likelihood of bursting disc or washer failure to begin with will essentially free up the possibility of using a larger-diameter bursting disc where previously that may have been inconceivable.)

Otherwise, as shown, a chief feature of discs 510a/b, respectively, is the inclusion of added score lines 514a/b. Here, the score lines 514a/b (e.g., which may be embodied by small grooves or etches in the discs 510a/b) are embodied by a "star" pattern, where four apices of the pattern are each located at a maximum radial dimension of discs 510a/b and are offset from one another by 90 degrees with respect to the circumference of discs 510a/b. As shown, extending from each of the apices are "legs" that open towards the center of each disc 510a/b, and meet at a central region of each disc 510a/b. The score lines 514a/b thus promote a more controlled and manageable yield of each disc 510a/b responsive to pressure buildup within the cells 502a/b; accordingly, by yielding "cleanly" before an extreme pressure buildup takes place, the undesirable collapse of washers 508a/b, akin to the behavior shown in FIG. 2(c), can be avoided. Other patterns than the "star" pattern illustrated can of course be borne by score lines, but a "star" pattern generally analogous to those shown in FIG. 5 will lend itself particularly well to a "clean" yield and thus uniform distribution of pressure on a bursting disc than in the case of other scoring patterns.

FIG. 6 provides (a) a cross-sectional elevational view of a battery cell 602 with a large opening design at the terminal 604 and (b) a plan view in isolation of the terminal 604 itself. Here, it will be appreciated, increased venting capability is afforded at the region of terminal 604 rather than with bursting disc 610. Particularly, terminal 604 may preferably be configured such that a nub 604a thereof, still sufficient for conducting battery power to a device, has extending therefrom a plurality of legs 618 that themselves terminate at an outer ring 620 of terminal 604; likewise, legs 618 and ring 620 are sufficiently configured to conduct battery power to a device. Accordingly, spaces 616 may remain between the legs 618 in order to permit increased venting from regions axially below terminal 604. Thus, this will help promote a more manageable and controlled venting of heat/gas/pressure responsive to a pressure buildup within cell 602, thereby considerably decreasing the risk of washer 608 collapsing akin to the behavior shown in FIG. 2(c). Of course, essentially any workable number of legs 618 may be employed as long as structural integrity of the terminal 604 is not compromised and battery power can still be sufficiently conducted to and through nub 604a.

FIG. 7 provides (a,c) cross-sectional elevational views of a battery cell 702 employing a composite bursting disc 718 in accordance with a variant embodiment of the present invention, and also in isolation (b,d) plan views a portion (718a) of the disc 718 itself.

Figure 7A:
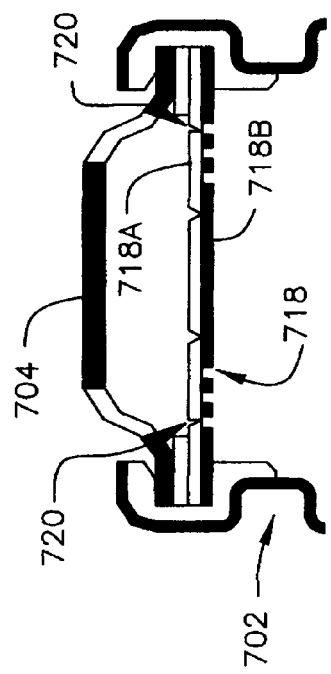
FIG. 7 provides (a,c) cross-sectional elevational views of a battery cell employing a composite bursting disc, and also in isolation (b,d) plan views of a portion of the disc itself.
Figure 7B:
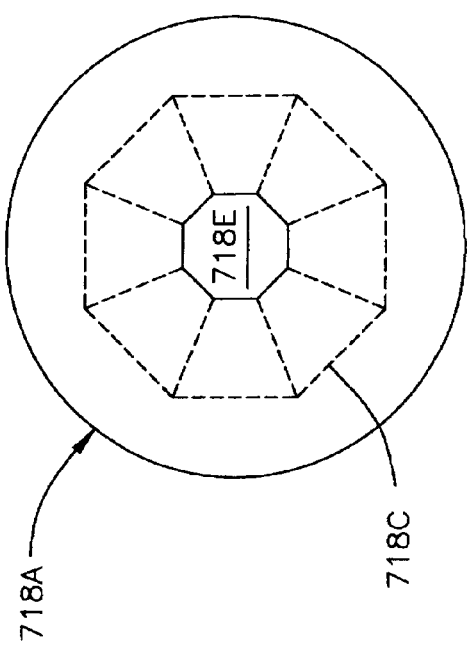

Referring to FIGS. 7(a)/(b), composite bursting disc 718 preferably takes the place of a combination washer and bursting disc as known conventionally and also described heretofore, and includes two portions, namely, an upper portion 718a which lies (e.g., is glued) atop a base portion 718b. Upper portion 718a a preferably includes a segmented portion 718c disposed radially inward of an outer circumferential edge of upper portion 718a. Preferably, segmented portion 718c is defined by scored segments (shown by the dotted lines) which meet at a central portion 718e; it is at least at central portion 718a that upper portion 718a is preferably bonded (e.g., glued) to base portion 718b. Here, eight segments are shown to meet at a central portion 718e in the form of an octagon, but essentially any suitable number of segments and essentially any suitable shape of central portion 718e, by way of carrying out the behavior now to be described, may be employed.

Essentially, base portion 718b may be configured as a solid disc containing perforations. Thus, the perforations would serve to transmit gas pressure towards the upper portion 718a; while base portion 718b and central portion 718a of upper portion 718a accordingly remain essentially stationary when gas is so transmitted, it will be appreciated that segments 718d of segmented portion 718c will be free to move in a manner described herebelow.

Figure 7C:
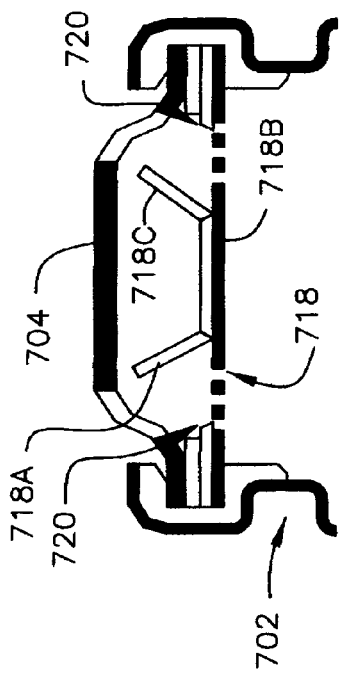
Figure 7D:
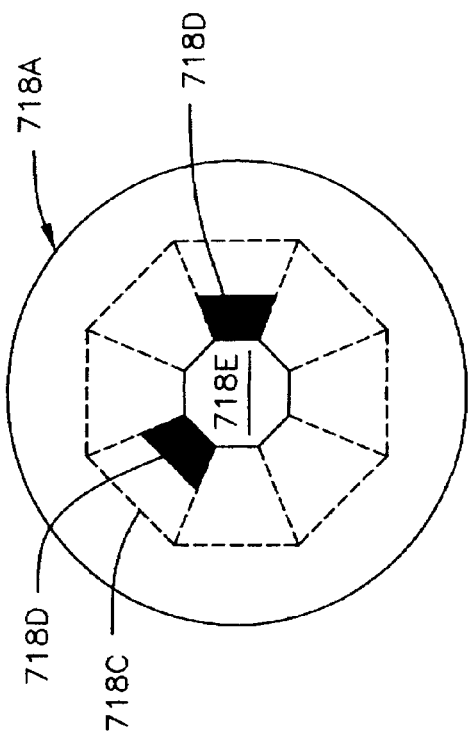

Preferably, including reference now to FIGS. 7(c)/(d), individual segments 718d of segmented portion 718c may preferably pivot upwardly responsive to a sufficient buildup of pressure below composite bursting disc 718. Thus, one or more segments 718d may yield and pivot upwardly at essentially any time when pressure buildup beneath a segment is sufficient to cause a segment to yield. An advantage is thus that composite bursting disc 718 as a whole will only have portions thereof yielding to a degree that is sufficient or necessary to accommodate a given pressure buildup within cell 702, meaning that it need not necessarily yield in toto at such a time. At the same time, this partial yielding effect ensures that at least moderate venting can and will occur at various levels of pressure buildup within cell 702, thus providing pressure relief as would be sufficient to prevent a larger-scale collapse of the composite disc 718 towards the terminal 704 (akin to the behavior in FIG. 2[*c*]).

In addition, there may optionally be provided a barbed portion 720 that extends as shown from terminal 704 towards bursting disc 718. This barbed portion 720 could be embodied by a complete peripheral flange extending inwardly from the terminal 704, or it could be plural flange portions so extending. Either way, the barbed portion 720 preferably includes a pointed extension or extensions as shown, which is/are configured for "punching" along one or more score lines when pressure buildup causes composite disc 718 to displace towards barbed portion(s) 720. Thus, this can assist in freeing segmented portions 718*d* so they can pivot upwardly as described heretofore.

It should be understood and appreciated that battery cells, as discussed and broadly contemplated herein, can be employed in any of a very wide variety of operating environments, including computers, cell phones, other mobile devices (such as personal digital assistants or PDA's), automobiles, and power tools (such as battery-operated power drills, saws, mowers and weed cutters). Thus, while FIG. 1 presents a computer system by way of a possible operating environment for a battery cell in accordance with an embodiment of the present invention, it of course should be understood that this is provided by way of merely an illustrative and non-restrictive example. Battery cells, as such, can act to power a load device or other item that is configured for being battery powered. In the case of a computer, a battery cell can serve to power various components including a main memory while in the case of an automobile a battery cell can serve to power an electric motor which propels motion of the automobile.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. Accordingly, the present embodiments are to be considered as illustrative and not restrictive, and the invention is not to be limited to the details given herein, but may be modified within the scope and equivalents of the appended claims. The Abstract, as submitted herewith, shall not be construed as being limiting upon the appended claims.

What is claimed is:

1. An apparatus comprising:
   a battery-operable device; and
   a battery cell which provides power to said battery-operable device;
   said battery cell comprising:
   a terminal; and
   a venting arrangement which acts to vent gas responsive to pressure buildup within said battery cell;
   said venting arrangement comprising a yieldable element which yields under pressure and a support which supports said yieldable element;
   said venting arrangement further comprising windowing disposed in said terminal, said windowing acting to vent gas to ambient;
   said venting arrangement further comprising a supplementary measure which forestalls collapse of said support and said yieldable element towards said terminal responsive to pressure buildup within said battery cell.

2. The apparatus according to claim 1, wherein said supplementary measure comprises increased sizing of said windowing, whereby said terminal comprises:
   a terminal nub;
   a terminal periphery; and
   a conductive connection between said terminal nub and said terminal periphery;
   said windowing being defined as space defined apart from said terminal nub, terminal periphery and conductive connection;
   said terminal nub, terminal periphery and conductive connection being of reduced physical dimension while providing sufficient battery power conductance to said terminal nub as well as sufficient structural integrity of said terminal nub, said terminal periphery and said conductive connection.

3. The apparatus according to claim 2, wherein:
   said conductive connection comprises a plurality of conductive extensions interconnecting said terminal hub and said terminal periphery; and
   said windowing comprises a plurality of windows.

4. The apparatus according to claim 1, wherein said venting arrangement further comprises a distancing arrangement which acts to establish space between said terminal and said yieldable element.

5. The apparatus according to claim 4, wherein said distancing arrangement comprises a spacer interposed between said terminal and said support.

6. The apparatus according to claim 5, wherein said spacer comprises a spacer ring.

7. The apparatus according to claim 6, wherein said spacer ring comprises a ring wall and a plurality of venting orifices disposed in said ring wall.

8. The apparatus according to claim 4, wherein:
   said distancing arrangement comprises a flange portion extending from said terminal towards said support;
   said flange portion acting to inhibit movement of said support responsive to a pressure buildup within said battery cell.

9. The apparatus according to claim 1, wherein:
   said yieldable element comprises scoring which promotes yielding of said yieldable element with respect to said support;
   said scoring comprising primary scoring and supplementary scoring;
   said supplementary measure comprising said supplementary scoring.

10. The apparatus according to claim 9, wherein said supplementary scoring comprises scoring disposed within peripheral regions of said yieldable element and interconnecting a plurality of points at peripheral regions of said yieldable element.

11. The apparatus according to claim 10, wherein said yieldable element comprises a yieldable disc.

12. The apparatus according to claim 1, wherein said yieldable element comprises a plurality of yieldable segments.

13. The apparatus according to claim 12, wherein said yieldable element further comprises scoring which delineates said yieldable segments from one another.

14. The apparatus according to claim 12, wherein said yieldable segments combine to surround a central region.

15. The apparatus according to claim 14, wherein said scoring is configured such that each of said yieldable segments pivots about a pivot axis lying adjacent to said central region.

16. The apparatus according to claim 12, wherein said yieldable element comprises a support layer and a scored layer disposed adjacent said support layer, said scored layer comprising said plurality of yieldable segments.

17. The apparatus according to claim 12, further comprising:
barbing extending from said terminal towards said yieldable element; and
scoring which delineates said yieldable segments from a surrounding portion of said yieldable element;
said barbing acting to promote separation of said yieldable segments from said surrounding portion of said yieldable element responsive to a pressure buildup within said battery cell.

18. The apparatus according to claim 1, wherein:
said battery-operable device comprises a physical computing device;
said physical computing device comprising a main memory;
said battery cell acting to provide power to said main memory.

19. The apparatus according to claim 1, wherein:
said apparatus comprises an automobile;
said battery-operable device comprises an electric motor which propels motion of said automobile;
said battery cell acting to provide power to said electric motor.

20. A battery cell comprising:
a terminal; and
a venting arrangement which acts to vent gas responsive to pressure buildup within said battery cell;
said venting arrangement comprising a yieldable element which yields under pressure and a support which supports said yieldable element;
said venting arrangement further comprising windowing disposed in said terminal, said windowing acting to vent gas to ambient;
said venting arrangement further comprising a supplementary measure which forestalls collapse of said support and said yieldable element towards said terminal responsive to pressure buildup within said battery cell.

21. The battery cell according to claim 20, wherein said supplementary measure comprises increased sizing of said windowing, whereby said terminal comprises:
a terminal nub;
a terminal periphery; and
a conductive connection between said terminal nub and said terminal periphery;
said windowing being defined as space defined apart from said terminal nub, terminal periphery and conductive connection;
said terminal nub, terminal periphery and conductive connection being of reduced physical dimension while providing sufficient battery power conductance to said terminal nub as well as sufficient structural integrity of said terminal nub, said terminal periphery and said conductive connection.

22. The battery cell according to claim 21, wherein:
said conductive connection comprises a plurality of conductive extensions interconnecting said terminal hub and said terminal periphery; and
said windowing comprises a plurality of windows.

23. The battery cell according to claim 20, wherein said venting arrangement further comprises a distancing arrangement which acts to establish space between said terminal and said yieldable element.

24. The battery cell according to claim 23, wherein said distancing arrangement comprises a spacer interposed between said terminal and said support.

25. The battery cell according to claim 24, wherein said spacer comprises a spacer ring.

26. The battery cell according to claim 25, wherein said spacer ring comprises a ring wall and a plurality of venting orifices disposed in said ring wall.

27. The battery cell according to claim 23, wherein:
said distancing arrangement comprises a flange portion extending from said terminal towards said support;
said flange portion acting to inhibit movement of said support responsive to a pressure buildup within said battery cell.

28. The battery cell according to claim 20, wherein:
said yieldable element comprises scoring which promotes yielding of said yieldable element with respect to said support;
said scoring comprising primary scoring and supplementary scoring;
said supplementary measure comprising said supplementary scoring.

29. The battery cell according to claim 28, wherein said supplementary scoring comprises scoring disposed within peripheral regions of said yieldable element and interconnecting a plurality of points at peripheral regions of said yieldable element.

30. The battery cell according to claim 29, wherein said yieldable element comprises a yieldable disc.

31. The battery cell according to claim 30, wherein:
said support comprises a washer which surrounds said yieldable disc; and
said primary scoring comprises a circular score which delineates said washer from said yieldable disc.

32. The battery cell according to claim 20, wherein said yieldable element comprises a plurality of yieldable segments.

33. The battery cell according to claim 32, wherein said yieldable element further comprises scoring which delineates said yieldable segments from one another.

34. The battery cell according to claim 32, wherein said yieldable segments combine to surround a central region.

35. The battery cell according to claim 34, wherein said scoring is configured such that each of said yieldable segments pivots about a pivot axis lying adjacent to said central region.

36. The battery cell according to claim 32, wherein said yieldable element comprises a support layer and a scored layer disposed adjacent said support layer, said scored layer comprising said plurality of yieldable segments.

37. The battery cell according to claim 32, further comprising:
barbing extending from said terminal towards said yieldable element; and scoring which delineates said yieldable segments from a surrounding portion of said yieldable element;

said barbing acting to promote separation of said yieldable segments from said surrounding portion of said yieldable element responsive to a pressure buildup within said battery cell.

38. The apparatus of claim 1, wherein said supplementary measure is configured to prevent clogging of said windowing disposed in said terminal.

* * * * *